Aug. 23, 1949.    G. H. HUFFERD    2,479,683
FLEXIBLE HOSE COUPLING
Filed Jan. 11, 1946

INVENTOR.
George H. Hufferd
BY Richey & Watts
ATTORNEYS

Patented Aug. 23, 1949

2,479,683

UNITED STATES PATENT OFFICE 2,479,683

FLEXIBLE HOSE COUPLING

George H. Hufferd, Shaker Heights, Ohio, assignor to The Weatherhead Company, Cleveland, Ohio, a corporation of Ohio Application January 11, 1946, Serial No. 640,579

3 Claims. (Cl. 285—84)

This invention relates to a device for clamping a hose or flexible tube to a relatively rigid tube or pipe. One common application of this invention is found in the cooling system of internal combustion engines, where a length of flexible hose is provided to permit relative motion of the engine with respect to the radiator. However, the clamping device of this invention can be used in any system of conduits where it is desired to attach a flexible hose or tube to a pipe and where excessive pressures will not be encountered.

Hose end types in the prior art designed to accomplish this purpose have been awkward to install, and have been relatively fragile. Some of these were straps clamped by screw means which rusted in place making removal very difficult. Devices of the prior art were often made up of thin straps which bend and break and which may injure or lacerate the hands of the average operator during the process of application and removal.

This invention has as its object the provision of a hose end clamp which is formed of one rigid piece, thereby dispensing with all screws, nuts, flanges or other moving parts. This entirely eliminates all freezing and rusting of moving parts, and results in a device which can be readily and safely applied and removed by an inexperienced operator. The attendant ease of application and removal provided by my invention is an important one, because in many cases the hoses deteriorate rapidly and must be replaced periodically.

A further object of my invention is the provision of a one-piece hose clamp which will firmly clamp the hose to the pipe without requiring the formation of special ridges or serrations on the pipe.

Broadly, these desirable improvements are obtained in the present invention by the provision of a hose clamp comprising a single one-piece nut of special and improved design, which nut simultaneously rides upon the hose and clamps it firmly to the tube as it is applied.

The above noted objects of my invention will appear from the following description thereof, references being made to the accompanying drawings, in which.

Figure 1:
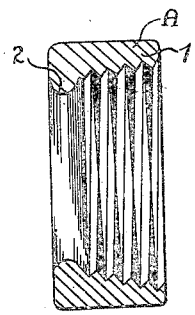
Fig. 1 is a cross-sectional view of my clamp nut.

In the cross section of Fig. 1, clamp nut A includes a thread portion 1, these threads forming an axially outward facing generally conical or tapering threaded surface. The larger diameter of the threaded portion is such that it will at least just clear the hose member, in order to facilitate ready starting of the nut. A radially inwardly extending lip 2 is also provided, this lip having a smooth accurate contour to facilitate entry of the nut along the hose. The exact contour of lip 2 is not critical, but that portion of the lip 2 which faces threads 1 should be tapered back somewhat to permit the lip 2 to ride up over the hose.

Figure 2:
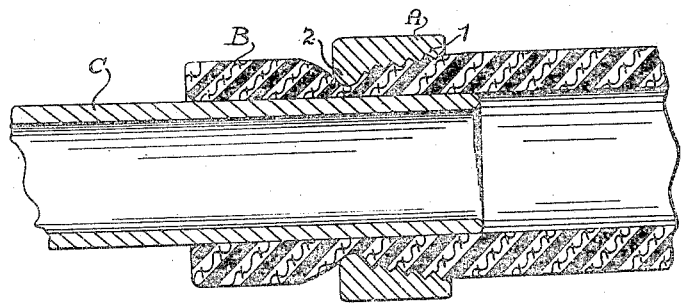
Fig. 2 is a cross-sectional view of the clamp nut as it clamps a hose to a plain tube.
Figure 3:
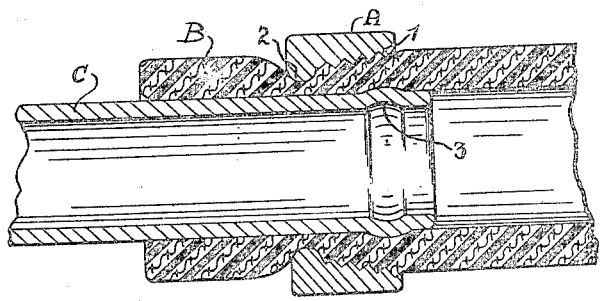
Fig. 3 is a cross-sectional view of the clamp nut clamping the hose to a ridged pipe member.

Fig. 3 illustrates how the nut A clamps the hose B to the pipe or tube member C. As the nut A is initially applied to the hose, and rotated, threads 1 engage the hose B and because of their conical formation, force the nut along the hose. As this occurs, the lip 2 also rides up on the hose and firmly compresses the hose around the pipe or tube C. The nut is turned until it has moved the proper distance along the hose, with which the hose is firmly clamped to the pipe C. As can be seen in Fig. 2, no special formation of pipe C is required, because as the nut is applied the powerful gripping action of lip 2 of nut A provides a leak proof seal with the pipe.

The proportions of the conical threaded portion and the lip of the nut should be such that the threads may drive the nut along the hose member without producing any substantial amount of laceration or cutting thereof. The lip itself, is proportioned to exert a more powerful gripping or clamping action than that provided by the small diameter section of the conical threaded portion. However, the lip is so shaped and proportioned that its action does not cut or damage the hose. As a general guide to the proportions of the nut, it may be stated that the smaller diameter of the conical threaded portion is such that the threads do not cut the hose, but if the conical threaded portion were extended very much further toward the apex of the cone, they would cut the hose. On the other hand, the lip portion extends radially inward to a diameter which would cause cutting of the hose if it were threaded, but the lip is shaped so that it merely deforms or compresses the hose without lacerating it.

Fig. 3 illustrates how the hose nut A of this invention can be employed to clamp a hose B to a pipe or tube C which pipe or tube is provided with a radial ridge 3. Although my improved hose clamp will firmly grip a cylindrical tube, it will form an exceptionally tight seal when working in conjunction with a tube deformed like that shown in Fig. 3.

Any common means to provide for turning the nut A may be formed on the nut. The nut may have a polygonal outer edge, it may be drilled for the reception of a pin wrench, or any of the other driving means common to the art may be employed.

Having described my invention, it will be seen that I have provided a simple one-piece clamp nut which will firmly clamp a flexible hose member to a pipe or tube member, and which can be readily removed and replaced.

Having thus described the present invention so that others skilled in the art may be able to understand and practice the same, I state that what I desire to secure by Letters Patent is defined in what is claimed.

What is claimed is:

1. A hose coupling comprising a tubular member, a resilient hose member fitted over said tubular member, a hose clamp nut formed with tapered internal helical threads and a circumferential inwardly directed lip adjacent the smaller end of said threads to compress the hose, said lip having a smaller internal diameter than the crest of the tapered thread adjacent said lip.

2. A hose coupling for a resilient hose comprising a tubular member for insertion within the hose to prevent crushing of the hose and a hose clamp nut formed with tapered internal helical threads of such diameter as to engage the hose and feed the nut along the hose when the nut is rotated, and a circumferential inwardly directed lip adjacent the smaller end of said threads to compress the hose against the tubular member, said lip having a smaller internal diameter than the crest of the tapered thread adjacent said lip.

3. A hose clamp nut adapted to clamp a relatively flexible hose to a relatively rigid conduit inserted into the hose comprising a generally annular rigid member having an axially outwardly facing substantially internally conical portion, said conical portion being formed with helical threads of substantially uniform cross-section that gradually increase in root diameter, and a radially inwardly extending lip adjacent the smaller diameter section of said conical threaded portion, the larger diameter of said conical threaded portion being large enough to permit ready starting of the nut on the hose, said lip extending radially inwardly farther than any of said threads, said lip being rounded and of a diameter that permits it to slide over the hose and compress a portion of the hose locally.

GEORGE H. HUFFERD.

REFERENCES CITED

The following references are of record in the file of this patent:

UNITED STATES PATENTS

| Number | Name | Date |
|---|---|---|
| 591,468 | Gold | Oct. 12, 1897 |
| 1,275,996 | Audemars | Aug. 13, 1918 |
| 2,248,576 | McConnhoie | July 8, 1941 |
| 2,319,024 | Wehringer | May 11, 1943 |